July 27, 1937. N. H. HILLER ET AL 2,088,060
METHOD AND APPARATUS FOR FILLING GAS CONTAINERS
Filed Sept. 25, 1935
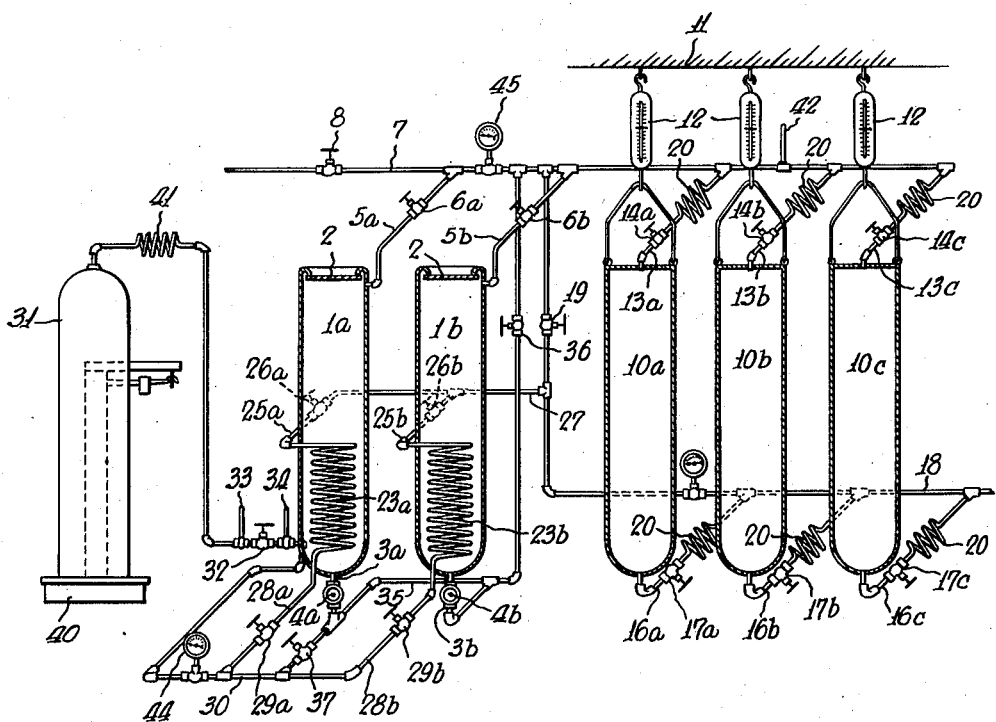
INVENTOR
Nicolai H. Hiller
Paul W. Hiller
BY
ATTORNEYS Patented July 27, 1937

2,088,060

UNITED STATES PATENT OFFICE 2,088,060

METHOD AND APPARATUS FOR FILLING GAS CONTAINERS

Nicolai H. Hiller, Carbondale, Pa., and Paul W. Hiller, Wilmington, Calif.

Application September 25, 1935, Serial No. 41,970

15 Claims. (Cl. 62—91.5)

One method in commercial use for charging a container with liquid carbon dioxide comprises placing a predetermined amount by weight of solid carbon dioxide in the container, hermetically sealing it, and permitting the enclosed solid carbon dioxide to liquefy by the exposure of the container to normal atmospheric temperatures. These containers, commonly called converters, are usually filled at atmospheric pressure, but as the solid carbon dioxide therein liquefies, the pressure in the containers increases to an extent dependent upon the volume of the container and the mass of the solid employed. The liquid carbon dioxide may be delivered therefrom under pressure into suitable receptacles or cylinders.

The difficulty in filling a receptacle with liquid carbon dioxide from a converter at high pressure is that the pressure in the receptacle, during filling, increases rapidly so that the pressures in the converter and the receptacle become prematurely equalized before the receptacle is filled to the desired amount. Under these conditions, a transfer pump is necessary. The use of such a pump is undesirable due to the power consumed; to the inevitable leakage which takes place especially at the stuffing boxes; to the necessity of frequently dismantling it to coat its cylinder with graphite so as to prevent "cutting"; and also to the freezing of the stuffing boxes that might take place with the transfer of carbon dioxide at low temperatures.

One object of the present invention is to provide a new and improved method and means for charging a cylinder with liquid carbon dioxide at high pressure.

Another object is to provide a new and improved method and system whereby the filling of a cylinder with a predetermined amount of liquid carbon dioxide at high pressure may be effected without the use of a transfer pump and with a minimum amount of loss of carbon dioxide.

A further object is to provide a new and improved method and means for increasing the rate of filling of a cylinder with liquid carbon dioxide.

One method that might be used for filling or charging an empty cylinder from a converter at high pressure is to pass an initial portion of the liquid carbon dioxide from said converter into said cylinder. The empty cylinder being usually at normal atmospheric temperature, the incoming liquid rapidly evaporates. The evaporated gaseous carbon dioxide in the cylinder can then be blown into a low pressure converter which has been freshly filled with solid carbon dioxide. This operation aids in the further evaporation of the liquid carbon dioxide in said cylinder and consequently causes the chilling of the cylinder to a desirable low temperature.

After the cylinder has been sufficiently chilled by this initial charge, the transfer of liquid carbon dioxide therein from the discharging converter can be continued until the desired amount of the liquid has passed into said cylinder. Such a method, however, is not entirely satisfactory under certain conditions.

In the preferred form of carrying out our invention, liquid carbon dioxide from a suitable high pressure receptacle such as a converter or storage tank, is first passed into heat exchange relationship with the solid carbon dioxide of a freshly filled converter, and then introduced into the cylinder to be filled. By this method, the latent heat of fusion of the solid carbon dioxide is utilized to cool the liquid carbon dioxide before it is introduced into the filling cylinder so that the filling cylinder is immediately chilled by the incoming liquid carbon dioxide. This operation reduces the amount of evaporation in the cylinder during the filling process, and serves to keep the pressure in the cylinder as low as possible, whereby a differential in pressure between the discharging receptacle and the filling cylinder is maintained during the complete filling process. Furthermore, in the last stages of filling, the gaseous carbon dioxide emerging from the discharging receptacle is condensed by the solid carbon dioxide of the freshly filled converter, thereby maintaining the temperature and therefore the pressure in the filling cylinder at the minimum until it has been filled to the desired amount.

This method and means serves not only to eliminate resort to a transfer pump, but also increases the rate of filling of the filling cylinder and cuts down the amount of loss of carbon dioxide, to a minimum.

As far as certain aspects of the invention are concerned, the liquid carbon dioxide may be dispensed directly from a high pressure converter in a manner already described. However, as a feature of the present invention, there is provided one or more storage tanks from which the carbon dioxide is dispensed. These storage tanks are filled from high pressure converters and dispensed from in a manner already described.

The converters and storage tanks are so interconnected by piping and the flow of carbon dioxide so controlled by valves as to effect the charging of the converters, filling of the storage tanks, and dispensing of the liquid selectively from said storage tanks or from said converters in a very facile and expeditious manner.

In the accompanying drawings there is shown, somewhat diagrammatically, for the purpose of illustration, an apparatus for carrying out the present invention.

There may be employed any desired number of converters. In the drawing there are shown two such converters $1a$ and $1b$ arranged alongside of each other and each having a removable closure member 2 which may be opened for the charging of the converters with solid carbon dioxide. These converters 1a and 1b are respectively provided at the bottoms thereof with pipes 3a and 3b controlled by valves 4a and 4b, and serving mainly as outlets for the liquid carbon dioxide, although they are also used as gas inlets as will be more fully described. The upper ends of these converters 1a and 1b are provided with gas outlet pipes 5a and 5b controlled respectively by valves 6a and 6b and connecting into a header 7, the outlet end of which may be opened to the atmosphere by operating a relief valve 8.

There is also provided a plurality of storage tanks. For purposes of illustration, there are shown three tanks 10a, 10b and 10c, suspended for limited vertical movement from a beam 11 by means of calibrated spring scales 12. These scales serve to indicate the amount of liquid carbon dioxide in the storage tanks at any time.

The tops of the storage tanks 10a, 10b and 10c are provided respectively with pipes 13a, 13b and 13c connected to the header 7 and having valves 14a, 14b and 14c.

The bottoms of the storage tanks 10a, 10b and 10c are provided respectively with pipes 16a, 16b and 16c having valves 17a, 17b and 17c. These pipes 16a, 16b and 16c are joined to a header 18 having a connection to the header 7 controlled by a valve 19. The upper and lower series of pipes have flexible or yieldable sections such as spiral pigtail portions 20 to permit limited vertical movement of the storage tanks.

As an important feature of the present invention, the converters 1a and 1b are provided in the interior thereof with coils 23a and 23b respectively, for passing liquid carbon dioxide in heat exchange relationship with the solid carbon dioxide in these converters. The inlet ends of the coils 23a and 23b are connected to pipes 25a and 25b respectively, having valves 26a and 26b and joining into a pipe 27 connected to the header 18. The outlet ends of the coils 23a and 23b are respectively connected to pipes 28a and 28b having valves 29a and 29b and joining into a supply pipe 30 for a container or cylinder 31 to be filled. This pipe 30 is provided with a valve 32 and has a pair of thermometers 33 and 34 disposed on opposite sides of said valve to indicate the temperature of the carbon dioxide in said pipe, and a pressure gauge 44 in advance of the valve 32.

The pipes 3a and 3b of the converters are connected to a pipe 35 one end of which is connected to the header 7, the other end being connected to the pipe 30. The pipe 35 is provided with a valve 36 in the portion between the pipe 3b and the header 7, and is provided with a valve 37 between the pipe 3a and the pipe 30.

In the process of filling the cylinder 31, said cylinder is placed on a suitable scale platform 40, the pipe 30 near the inlet end of said cylinder having a flexible section such as a spiral pigtail portion 41 for permitting limited vertical movement of said cylinder 31 as it is filled, and so that the amount of carbon dioxide therein may be indicated on said scale.

For the purpose of illustrating the operation of the apparatus, let us assume that the converter 1a has 60 pounds of liquid carbon dioxide at a pressure of 900 pounds per square inch; that the converter 1b has been freshly charged and has 50 pounds of solid carbon dioxide at a pressure of about 25 pounds per square inch; and that the storage tank 10a has just been discharged and contains carbon dioxide gas at a pressure of 200 pounds per square inch. If it is desired to refill the storage tank 10a, the gas therein is blown into the converter 1b to reduce the pressure in said storage tank to say about 50 pounds per square inch and to raise the pressure in the converter 1b to, for example, about 40 pounds per square inch. This is accomplished by opening the valves 17a, 19, 36 and 4b and closing all the other valves to admit the gas to the bottom of the converter 1b through the pipe 3b. The storage tank 10a may then be covered with a suitable hair felt blanket to heat insulate the same. Although this is desirable, it is not necessary since the filling operation is extremely rapid, and the radiation is very limited. The liquid carbon dioxide is then delivered from the converter 1a through the coil 23b in heat exchange relationship with the solid carbon dioxide in the freshly filled converter 1b, and then into the storage tank 10a through the pipe 13a. This is accomplished by opening valves 4a, 37, 29b, 26b, 19 and 14a and closing all the other valves, the valve 14a being throttled just enough so that the temperature in the header 7 as indicated by a suitable thermometer 42, is about 10° to 15° F. higher than the temperature in the converter 1a due to its pressure. This will chill the storage tank 10a and cause it to be filled to, for example, 50 pounds by weight of carbon dioxide. This will also cause a decrease in pressure in the converter 1a to, for example, 600 pounds per square inch, an increase in the pressure in the converter 1b to, for example 100 pounds per square inch, and in the storage tank 10a to, for example, 150 pounds per square inch. At this point in the cycle of operation, the liquid carbon dioxide will have been completely expelled from the converter 1a, the only carbon dioxide remaining therein being in gaseous form.

In the last stages, when the carbon dioxide coming from the converter 1a is in this gaseous form, this gaseous carbon dioxide in passing through the coil 23b will condense so that the carbon dioxide flowing into the storage tank 10a to the very end of the filling cycle, will be in liquid form. This will continue until the pressure in the converter 1a and the storage tank 10a are equalized at for example 200 pounds per square inch.

After the storage tank 10a has been filled at this equalized pressure, the gaseous carbon dioxide remaining in the converter 1a is blown into the converter 1b until the pressure in both converters has been equalized, this being accomplished by closing all the valves and opening valves 4a and 4b.

A fresh charge of solid carbon dioxide of, for example, 50 pounds in the converter 1b is sufficient to cool 150 to 200 pounds of carbon dioxide passing through its coil 23b, so that if the storage tanks 10b and 10c are also empty and there are other converters containing liquid carbon dioxide ready to be discharged, the liquid from these other converters may also be made to pass through the converter 1b before this converter is in condition to discharge its contents.

If there is a battery of three converters, the gaseous carbon dioxide in the converter that has just been emptied and reduced to low pressure, may be blown into the converter which has just been filled with solid carbon dioxide and which has not yet been cut into the cycle of operation. In this way, the gas in the converter 1a just emptied may be reduced to very low pressure, for example, about 50 pounds per square inch. This gas may be blown into the atmosphere before recharging, with a loss of only a few ounces of carbon dioxide.

With the converter 1a freshly filled and at low pressure, the cylinder 31 can now be filled from the storage tank 10a. In order to accomplish the filling of the cylinder 31, all the valves are closed and the cylinder 31 is covered with a heat insulating blanket. Then valves 17a, 26a, 29a and 32 are opened to permit the liquid from the storage tank 10a to pass through the coil 23a in heat exchange relationship with the solid carbon dioxide in the converter 1a. The valve 32 is throttled sufficiently so that the temperature indicated by the thermometer 34 will be about 10° F. higher than the temperature due to the pressure in the converter 1a as indicated by the pressure gauge 44. This filling operation is continued until the cylinder 31 is filled or until all of the liquid has been drained out of the storage tank 10a.

In the final stages of the filling operation, the gaseous carbon dioxide passing from the storage tank 10a will be condensed in the coils 23a. When the pressures in the tanks 10a and 31 are equalized, the gaseous carbon dioxide in the storage tank 10a is blown into the converter 1b whose content, in the meantime, has been discharged into one of the other storage tanks in a manner already described, and which has been freshly filled with solid carbon dioxide. In case there is insufficient charge in the storage tank 10a to fill the cylinder 31 to the desired weight, then either one of the other storage tanks may be cut in to fill in the desired weight.

In case it is desired to fill the cylinder 31 from a converter, as for example the converter 1b, without the use of the storage tanks, the valves 4b, 36, 19, 26a and 29a are opened, the valve 32 being throttled as previously indicated, and all the other valves being closed, so that the liquid from the converter 1b will pass through the coils 23a in heat exchange relationship with the solid carbon dioxide in the freshly filled converter 1a.

In case the cylinder 31 has lost some of its charge, and it is desired to fully charge it, then the pressure in said cylinder may be reduced by passing the carbon dioxide from said cylinder through one of the coils of a freshly filled converter and into an empty storage tank, for example storage tank 10b, until the pressure in the cylinder 31, as indicated by gauge 45 in the header 7, is sufficiently low to permit the cylinder 31 to be recharged out of a filled storage tank as for instance storage tank 10a. This may be accomplished by opening valves 32, 29a, 26a, 19 and 14b, and closing all the other valves, assuming that the converter 1a is the one freshly filled.

In case one of the storage tanks contains gas or liquid and gas at atmospheric temperature and therefore under high pressure, this gas may be permitted to flow to the upper portion of one of the converters by opening the valves of the appropriate pipes 13a, 13b or 13c and 5a or 5b, and the pressure may be thus employed for rapidly forcing the low temperature liquid out of the bottom of the converter and into the cylinder 31.

When the solid carbon dioxide has been almost completely liquefied in one of the converters, for instance converter 1a, the valves 4a, 36, 19, 26a and 29a may be opened so that the liquid will pass through the coil of the same converter before being delivered to the cylinder 31.

Various other operations may be carried out by means of our improved construction. For instance, if the tank 10b contain only gas at low pressure, the tank 10a contain gas at high pressure but no liquid, and the converter 1a contain cold liquid, the valves 14a and 6a may be opened to put the converter 1a under high pressure. These valves may then be closed and the valves 4a, 37, 29a, 26a, 19 and 14b may be opened so that the high pressure in the converter 1a will force the liquid from the converter through the heat transfer coil of the same converter, and thence into the empty tank 10b. As the liquid enters the last mentioned tank from the top, it chills the whole tank and prevents the accumulation of warm compressed gas at the top. When the pressures in the tank 10b and converter 1a have equalized, the valves 19 and 14b may be closed and the valves 17b opened, so that continued filling of the tank 10b may be from the bottom, and the valves 14a and 6a may be opened so that the residual high pressure in the tank 10a may be applied to the liquid in the converter 1a and force the remainder of the liquid into the tank 10b.

The present invention not only permits the rapid filling of a container without the use of a transfer pump and with very little loss of carbon dioxide, but also serves to liquefy the solid carbon dioxide in a converter in a much shorter time than in former processes. A converter usually takes from 3 to 5 hours to melt the dry ice therein. However, by means of a coil in the converter, and by means of the method practiced in conjunction therewith as described, the solid carbon dioxide in such a converter may be liquefied in 15 to 20 minutes.

Although the invention has been illustrated by an apparatus containing two converters and three storage tanks, the apparatus may include any number of converters and storage tanks in accordance with the capacity desired.

Although the apparatus is desired for use with carbon dioxide, it may be employed for any other medium which may exist in solid, liquid and gaseous phases, particularly if the melting point of the solid and the boiling point of the liquid at atmospheric pressure, is below ordinary atmospheric temperature.

Having thus described our invention, what we claim as new and desire to secure by Letters Patent is:—

1. A method for charging a container with liquid carbon dioxide, which comprises transferring liquid carbon dioxide from a converter into a storage tank, and then passing the liquid carbon dioxide at high pressure from said storage tank into heat exchange relationship with solid carbon dioxide in a freshly filled converter, and then into said container.

2. An apparatus for filling a container with liquid carbon dioxide, including a converter having a coil in the interior thereof, a receptacle adapted to contain liquid carbon dioxide at high pressure, and valved pipe connections for passing the liquid carbon dioxide from said receptacle through the coil of said converter and into said container whereby liquid carbon dioxide passing through said coil and into said container will be chilled by the latent heat of fusion of the solid carbon dioxide contained in said converter when freshly filled.

3. An apparatus for filling a container with liquid carbon dioxide, including a pair of converters, each having a coil in the interior thereof adapted to be contacted with the solid carbon dioxide in said converter when freshly filled, a supply pipe for said container, and pipe and valve means for passing the liquid carbon dioxide from one converter through the coil of the other converter in heat exchange relationship with solid carbon dioxide contained in said converter when freshly filled, and then to said supply pipe.

4. An apparatus for filling a container with liquid carbon dioxide, including a plurality of converters, a storage tank, valved connections for passing liquid carbon dioxide from one of the converters into heat exchange relationship with solid carbon dioxide in the other converter, and then into said storage tank, and means for delivering liquid carbon dioxide from said storage tank at high pressure into heat exchange relationship with solid carbon dioxide in one of said converters and into said container.

5. An apparatus for filling a container with liquid carbon dioxide, including a plurality of converters, a plurality of storage tanks, valved connections for delivering liquid carbon dioxide from any one of said converters into heat exchange relationship with solid carbon dioxide in another converter and thence into any one of said storage tanks, and valved connections for delivering liquid carbon dioxide from any one of said storage tanks directly into said container.

6. An apparatus for filling a container with liquid carbon dioxide, including a plurality of converters, a plurality of storage tanks, valved connections for delivering liquid carbon dioxide from any one of said converters into heat exchange relationship with solid carbon dioxide in another converter, and thence into any one of said storage tanks, and valved connections for delivering liquid carbon dioxide from any one of said storage tanks either into heat exchange relationship with solid carbon dioxide in one of said converters, and thence into said container, or directly from any one of said storage tanks into said container.

7. An apparatus for filling a container with liquid carbon dioxide, including a plurality of converters, a plurality of storage tanks, a coil within each converter, valved pipe connections between one end of each coil and the lower portion of each storage tank, valved pipe connections between the other end of each coil and said container, and valved pipe connections constituting a bypass whereby liquid carbon dioxide may be delivered from the bottom of any storage tank directly to the container without passing through any one of said coils.

8. An apparatus for filling a container with carbon dioxide, including a plurality of converters, a storage tank, valve connections for delivering liquid carbon dioxide from one of said converters into said storage tank, and valve connections for delivering carbon dioxide from either the top of the storage tank or the bottom of the storage tank, and in heat exchange relationship with solid carbon dioxide in one of said converters and thence into said container.

9. An apparatus for filling a container with carbon dioxide, including a plurality of converters, a storage tank, valve connections for passing liquid carbon dioxide from one of the converters into either the top or the bottom of said storage tank, valve connections for passing carbon dioxide from either the top or the bottom of said tank and in heat exchange relationship with solid carbon dioxide in one of said converters and thence into said container, and valved pipe connections for passing carbon dioxide from either the top or the bottom of said storage tank directly to either container without passing in heat exchange relationship with said solid carbon dioxide.

10. An apparatus for filling a container with liquid carbon dioxide, including a plurality of converters, a plurality of storage tanks, valved connections for delivering liquid carbon dioxide from any one of said converters into heat exchange relationship with solid carbon dioxide in another converter, and thence into any one of said storage tanks, and valved connections for delivering carbon dioxide from the top of any one of said storage tanks into heat exchange relationship with solid carbon dioxide in one of said converters, and thence into said container.

11. An apparatus for filling a container with liquid carbon dioxide, including a plurality of converters, a plurality of storage tanks, valved connections for delivering liquid carbon dioxide from any one of said converters into heat exchange relationship with solid carbon dioxide in another converter, and thence into any one of said storage tanks, and valved connections for delivering carbon dioxide from the top of any one of said storage tanks directly into said container.

12. An apparatus for filling a container with liquid carbon dioxide, including a plurality of converters, a plurality of storage tanks, valved connections for delivering liquid carbon dioxide from any one of said converters into heat exchange relationship with solid carbon dioxide in another converter, and thence into any one of said storage tanks, and valved connections for delivering carbon dioxide from the bottom of any one of said storage tanks directly into said container.

13. An apparatus for filling a container with liquid carbon dioxide, including a plurality of converters, a plurality of storage tanks, valved connections for delivering liquid carbon dioxide from any one of said converters into heat exchange relationship with solid carbon dioxide in another converter and thence into any one of said storage tanks, and valved connections for delivering carbon dioxide from any one of said storage tanks, or from one of said converters, directly into said container.

14. An apparatus for filling a container with liquid carbon dioxide, including a plurality of converters, a plurality of storage tanks, valved connections for delivering liquid carbon dioxide from any one of said converters into heat exchange relationship with solid carbon dioxide in another converter, and thence into the top of any one of said storage tanks, and valved connections for delivering liquid carbon dioxide from any one of said storage tanks directly into said container.

15. An apparatus for filling a container with liquid carbon dioxide, including a plurality of converters, a plurality of storage tanks, valved connections for delivering liquid carbon dioxide from any one of said converters into heat exchange relationship with solid carbon dioxide in another converter, and thence into the bottom of any one of said storage tanks, and valved connections for delivering liquid carbon dioxide from any one of said storage tanks directly into said container.

NICOLAI H. HILLER.
PAUL W. HILLER.